(12) United States Patent
Ferreira

(10) Patent No.: US 9,389,747 B2
(45) Date of Patent: Jul. 12, 2016

(54) QUICK CLOSE BUTTON

(75) Inventor: Allan Marshal Ferreira, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 13/355,858

(22) Filed: Jan. 23, 2012

(65) Prior Publication Data

US 2013/0191764 A1 Jul. 25, 2013

(51) Int. Cl.
*G06F 3/0481* (2013.01)

(52) U.S. Cl.
CPC .................... *G06F 3/0481* (2013.01)

(58) Field of Classification Search
CPC .................................... G06F 3/0481
USPC .......................................... 715/760
See application file for complete search history.

(56) References Cited

U.S. PATENT DOCUMENTS

| 5,758,095 | A  | * | 5/1998 | Albaum et al. .................... 705/2 |
| 6,169,548 | B1 |   | 1/2001 | Haynes |
| 6,239,796 | B1 | * | 5/2001 | Alexander .................... 715/809 |
| 6,874,126 | B1 |   | 3/2005 | Lapidous |
| 7,802,184 | B1 | * | 9/2010 | Battilana ............... G06F 3/0236 715/256 |
| 2002/0107735 | A1 | * | 8/2002 | Henkin et al. .................. 705/14 |
| 2004/0015398 | A1 | * | 1/2004 | Hayward ............... G06Q 30/02 705/14.49 |
| 2005/0188332 | A1 | * | 8/2005 | Kolman ............... G06F 3/0482 715/822 |
| 2006/0184875 | A1 | * | 8/2006 | Okada et al. .................. 715/516 |
| 2007/0291298 | A1 | * | 12/2007 | Kodimer ............ H04N 1/00411 358/1.15 |
| 2008/0040684 | A1 | * | 2/2008 | Crump .................. G06F 3/0482 715/808 |
| 2009/0327947 | A1 | * | 12/2009 | Schreiner ............. G06F 3/0483 715/777 |
| 2010/0185979 | A1 |   | 7/2010 | Shores et al. |
| 2011/0047488 | A1 | * | 2/2011 | Butin .................. G06F 3/04842 715/762 |
| 2011/0301943 | A1 | * | 12/2011 | Patch ............................... 704/9 |

FOREIGN PATENT DOCUMENTS

WO  WO-2004/095415 A1 * 11/2004 ............... G09G 5/00

* cited by examiner

*Primary Examiner* — Doon Chow
*Assistant Examiner* — Conrad Pack
(74) *Attorney, Agent, or Firm* — Brian J. Colandreo, Esq.; Jeffrey T. Placker, Esq.; Holland & Knight LLP

(57) ABSTRACT

A method, computer program product, and computer system for a quick close button for web browsers. A computing device determines a second web browser window was launched by a first web browser window. The computing device determines a location of a cursor. The computing device generates a close button associated with the second web browser window. The computing device displays the close button at the location of the cursor. Other methods and systems are described.

17 Claims, 3 Drawing Sheets

QUICK CLOSE BUTTON

TECHNICAL FIELD

This disclosure relates to web pages, and more particularly, to a quick close button associated with web pages.

BACKGROUND

Users browsing Internet web sites may encounter pop-up or pop-under windows. A pop-up window may contain unsolicited advertisements intended to attract web traffic or capture information from the user, such as email addresses or browsing preferences. Pop-up ads may be in the form of new web browser windows generated or launched by the web site and displayed above the web browser. Pop-up ads may also be in the form of an overlay of the web site, in which content is obscured by the overlay. Pop-under windows are a variation of pop-up windows, where a new window browser window is open or launched beneath the active browser window.

BRIEF SUMMARY

In one implementation, a method for a quick close button, performed by one or more computing devices, includes a computing device determining a second web browser window was launched by a first web browser window. The computing device determines a location of the cursor. The computing device generates a close button associated with the second web browser window. The computing device displays the close button at the location of the cursor.

One or more of the following features may be included. In some embodiments, the computing device may close the second web browser window in response to receiving an input from a user via the close button. The computing device may remove the close button in response to receiving the input from the user via the close button. In some embodiments, the second browser window may be a pop-up browser window or a pop-under browser window. In some embodiments, the computing device may generate a second close button associated with a third web browser window. The computing device may display the second close button. The computing device may close the third web browser window in response to receiving a second input from the user via the second close button. In some embodiments, the computing device may associate the close button with the second web browser and at least one additional browser window launched by the first web browser window. The computing device may close the second web browser window and the at least one additional browser window in response to receiving the input from the user via the close button. In some embodiments, the computing device may remove the close button in response to receiving an input from a user clicking outside the close button.

In another implementation, a computer program product resides on a computer readable medium that has a plurality of instructions stored on it. When executed by a processor, the instructions cause the processor to perform operations including determining a second web browser window was launched by a first web browser window; determining a location of a cursor; generating a close button associated with the second web browser window; and displaying the close button at the location of the cursor.

One or more of the following features may be included. In some embodiments, the computing device may close the second web browser window in response to receiving an input from a user via the close button. The computing device may remove the close button in response to receiving the input from the user via the close button. In some embodiments, the second browser window may be a pop-up browser window or a pop-under browser window. In some embodiments, the computing device may generate a second close button associated with a third web browser window. The computing device may display the second close button. The computing device may close the third web browser window in response to receiving a second input from the user via the second close button. In some embodiments, the computing device may associate the close button with the second web browser and at least one additional browser window launched by the first web browser window. The computing device may close the second web browser window and the at least one additional browser window in response to receiving the input from the user via the close button. In some embodiments, the computing device may remove the close button in response to receiving an input from a user clicking outside the close button.

In another implementation, a computing system includes a processor and memory configured to perform operations including determining a second web browser window was launched by a first web browser window; determining a location of a cursor; generating a close button associated with the second web browser window; and displaying the close button at the location of the cursor.

One or more of the following features may be included. In some embodiments, the computing device may close the second web browser window in response to receiving an input from a user via the close button. The computing device may remove the close button in response to receiving the input from the user via the close button. In some embodiments, the second browser window may be a pop-up browser window or a pop-under browser window. In some embodiments, the computing device may generate a second close button associated with a third web browser window. The computing device may display the second close button. The computing device may close the third web browser window in response to receiving a second input from the user via the second close button. In some embodiments, the computing device may associate the close button with the second web browser and at least one additional browser window launched by the first web browser window. The computing device may close the second web browser window and the at least one additional browser window in response to receiving the input from the user via the close button. In some embodiments, the computing device may remove the close button in response to receiving an input from a user clicking outside the close button.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
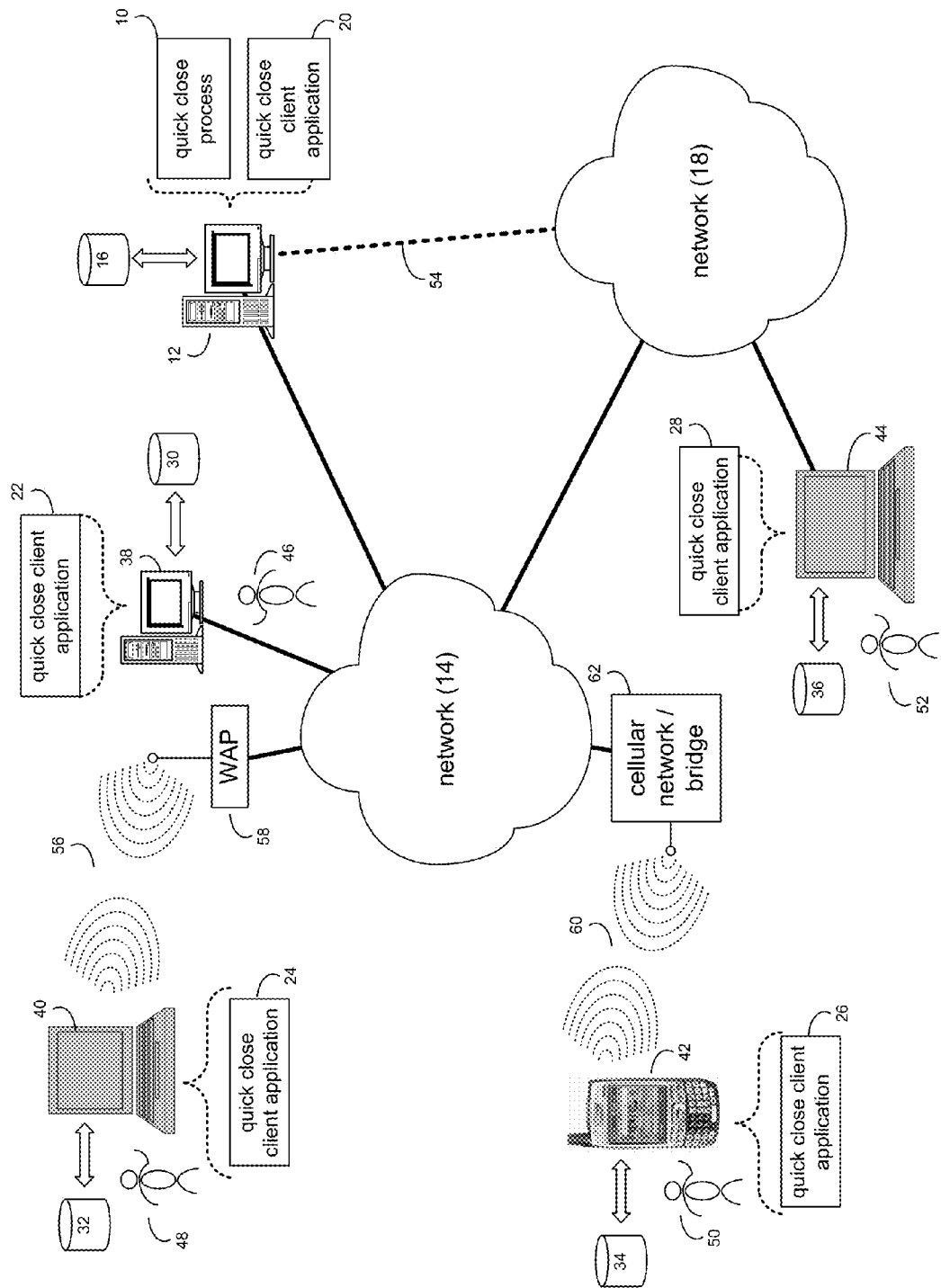
FIG. 1 is a diagrammatic view of a quick close process coupled to a distributed computing network.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java®, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown quick close process 10 that may reside on and may be executed by computer 12, which may be connected to network 14 (e.g., the Internet or a local area network). Examples of computer 12 may include but are not limited to a single server computer, a series of server computers, a single personal computer, a series of personal computers, a mini computer, a mainframe computer, or a computing cloud. The various components of computer 12 may execute one or more operating systems, examples of which may include but are not limited to: Microsoft® Windows Server®; Novell® Netware®; Red Hat® Linux®, Unix®, or a custom operating system, for example.

As will be discussed below in greater detail, quick close process 10 may determine a second web browser window was launched by a first web browser window. A location of the cursor may be determined. A close button associated with the second web browser window may be generated. The close button may be displayed at the location of the cursor.

The instruction sets and subroutines of quick close process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Quick close process 10 may be accessed via quick close client applications 20, 22, 24, 26, 28. Examples of quick close client applications 20, 22, 24, 26, 28 may include but are not limited to a standard web browser, a customized web browser, or a custom application. The instruction sets and subroutines of quick close client applications 20, 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a server (not shown), a data-enabled, cellular telephone (not shown), and a dedicated network device (not shown).

One or more of quick close client applications 20, 22, 24, 26, 28 may be configured to effectuate some or all of the functionality of quick close process 10. Accordingly, quick close process 10 may be a purely server-side application, a purely client-side application, or a hybrid server-side/client-side application that is cooperatively executed by one or more of quick close client applications 20, 22, 24, 26, 28 and quick close process 10.

Users 46, 48, 50, 52 may access computer 12 and quick close process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection. Client electronic devices 38, 40, 42, 44 may each execute an operating system, examples of which may include but are not limited to Apple® iOS®, Microsoft® Windows®, Android®, Red Hat® Linux®, or a custom operating systems.

Figure 2:
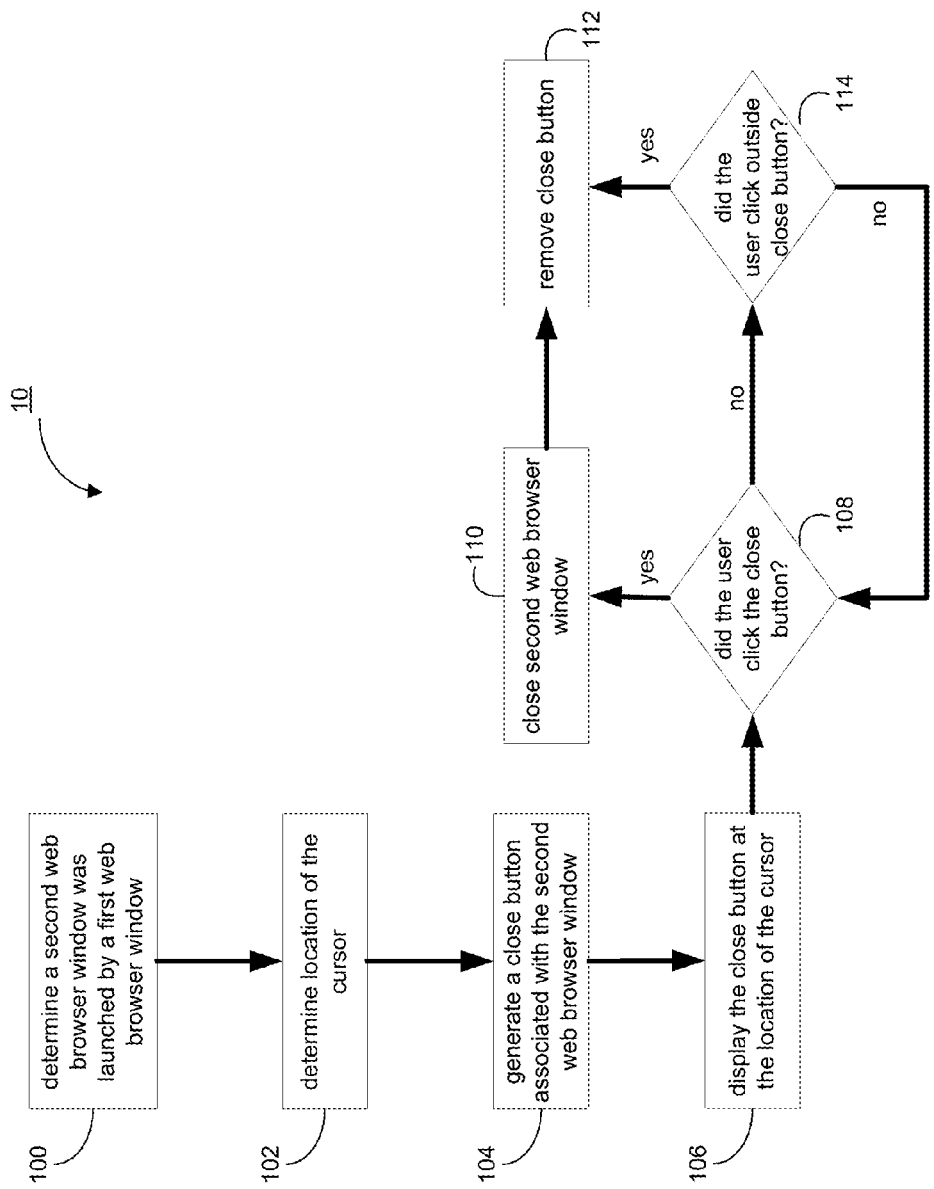
FIG. 2 is a flowchart of quick close process of FIG. 1.

Now referring to FIG. 2, a quick close process 10 may determine 100 a second web browser window was launched by a first web browser window. Quick close process 10 may determine 102 the location of the cursor. A close button associated with the second web browser window may be generated 104. Quick close process 10 may display 106 the close button at the location of the cursor. In some embodiments, quick close process 10 may determine 108 whether the user clicked the close button. In some embodiments, if quick close process 10 determines 108 that the user clicked the close button, then quick close process 10 may close 110 the second web browser window and remove 112 the close button. In some embodiments, if quick close process 10 determines 108 that the user did not click the close button, quick close process 10 may determine 114 if the user clicked outside the close button. In some embodiments, if quick close process 10 determines 114 that the user did click outside the close button, then quick close process 10 may remove 112 the close button. In some embodiments, if quick close process 10 determines 114 that the user did not click outside the close button, then quick close process 10 may determine 108 whether the user clicked the close button.

Quick close process 10 may determine 100 a second web browser window was launched by a first web browser window. In some embodiments, the second browser window may be a pop-up browser window or a pop-under browser window. An example of a pop-up browser window may include pop-up ads (also known as pop-ups), which may be a form of advertising or information gathering. Pop-up ads may be new web browser windows launched by a web page. Other varieties of pop-up browser windows may also be launched by the first web browser window. A pop-under may be a variation of the pop-up window where a new browser window is launched under the active browser window (e.g., in the background of the display relative to the active browser window). A web page or web browser window may launch a single pop-up or pop-under window. In other embodiments, a web page or web browser window may launch multiple pop-up or pop-under windows.

In some embodiments, pop-up ads may not be a new browser window, and instead, may be an overlay of the active web browser window. For instance, in some embodiments, the pop-up may be an overlay of the active window, which masks the active window until the pop-up is closed or until a pre-determined amount of time has elapsed. In some embodiments, the user may be unable to interact with the active browser window due to the pop-up overlay. In some embodiments, the user may be able to interact with the active browser window but the content of the active browser window may be obscured by the pop-up overlay.

Quick close process 10 may determine 102 the location of the cursor. In some embodiments, the location of the cursor may be determined by interacting with the operating system of the computing device, such as, for example, by an application programming interface function call. In some embodiments, the location of the cursor may be determined 102 through an image recognition approach, wherein the computing device may scan the display to identify any objects that may be a cursor.

A close button associated with the second web browser window may be generated 104. In some embodiments, quick close process 10 may associate the close button with the second web browser and at least one additional browser window launched by the first web browser window. Quick close process 10 may close the second web browser window and the at least one additional browser window in response to receiving the input from the user via the close button. For example, if the user clicks the close button, quick close process 10 may receive the input from the close button and close multiple web browser windows associated with the close button in response to a single click received from the user through the close button.

For example, quick close process 10 may associate the close button with multiple pop-up and/or pop-under windows. If a user clicks the close button, quick close process 10 may close all the pop-up and/or pop-under windows associated with the close button. In some embodiments, quick close process 10 may associate each pop-up and/or pop-under window with a separate close button. In some embodiments, quick close process 10 may associate the close button with a STOP function of video and/or audio content of the web page. In some embodiments, the video and/or audio content may be part of a pop-up and/or pop-under window. In some embodiments, the video and/or audio content of the web page may automatically play. Associating the close button with the STOP function of the video and/or audio content may permit the user to stop the video and/or audio content that may be playing.

Quick close process 10 may display 106 the close button at the location of the cursor. In some embodiments, if quick close process 10 generated multiple close buttons, then quick close process 10 may display each close button at an offset from each other. For examples, the multiple close buttons may be tiled, may be stacked directly on top of each other, or may be stacked in a cascade so that at least a part of each close button is visible to the user.

Quick close process 10 may determine 108 whether the user clicked the close button. If quick close process 10 determines 108 that the user clicked the close button, then quick close process 10 may close 110 the second web browser window and may remove 112 the close button.

In some embodiments, quick close process 10 may close the second web browser window in response to receiving an input from a user via the close button. Quick close process 10 may remove the close button in response to receiving the input from the user via the close button. In some embodiments, quick close process 10 may remove the close button in response to the pop-up and/or pop-under window being closed, regardless of the method used to the close the window.

If quick close process 10 determines 108 that the user did not click the close button, quick close process may determine 114 if the user clicked outside the close button. If quick close process 10 determines 114 that the user did click outside the close button, then quick close process 10 may remove 112 the close button. In some embodiments, quick close process 10 may remove the close button in response to receiving an input from a user clicking outside the close button. If quick close process 10 determines 114 that the user did not click outside the close button, then quick close process 10 may determine 108 whether the user clicked the close button.

In some embodiments, quick close process 10 may determine that the user did not click the close button and moved the cursor outside of the close button. In some embodiments, quick close process 10 may remove the close button in response to quick close process 10 determining that the user moved the cursor outside of the close button. In some embodiments, quick close process 10 may determine that the user moved the cursor outside of the close button by determining a current location of the cursor after generation of the close button. In some embodiments, quick close process 10 may determine that the user moved the cursor outside of the close button by tracking the location of the cursor after generation of the close button.

In some embodiments, quick close process 10 may generate a second close button associated with a third web browser window. Quick close process 10 may close the third web browser window in response to receiving a second input from the user via the second close button.

Quick close process 10 may display the second close button. In some embodiments, quick close process 10 may not generate the second close button until the first close button has been removed. In some embodiments, quick close process 10 may generate and display the second close button at an offset from the first close button, so that the multiple close buttons may be visible to the user. In some embodiments, the close button may include the title of the pop-up window to indicate that the close button is associated with the particular pop-up window. In some embodiments, quick close process 10 may generate a close button using a different color than the active browser window and may modify the pop-up window (i.e., by using an overlay) to match the color of the close button, which may indicate to the user that all windows that have the same color are associated with the close button and will be closed if the close button is clicked.

Figure 3:
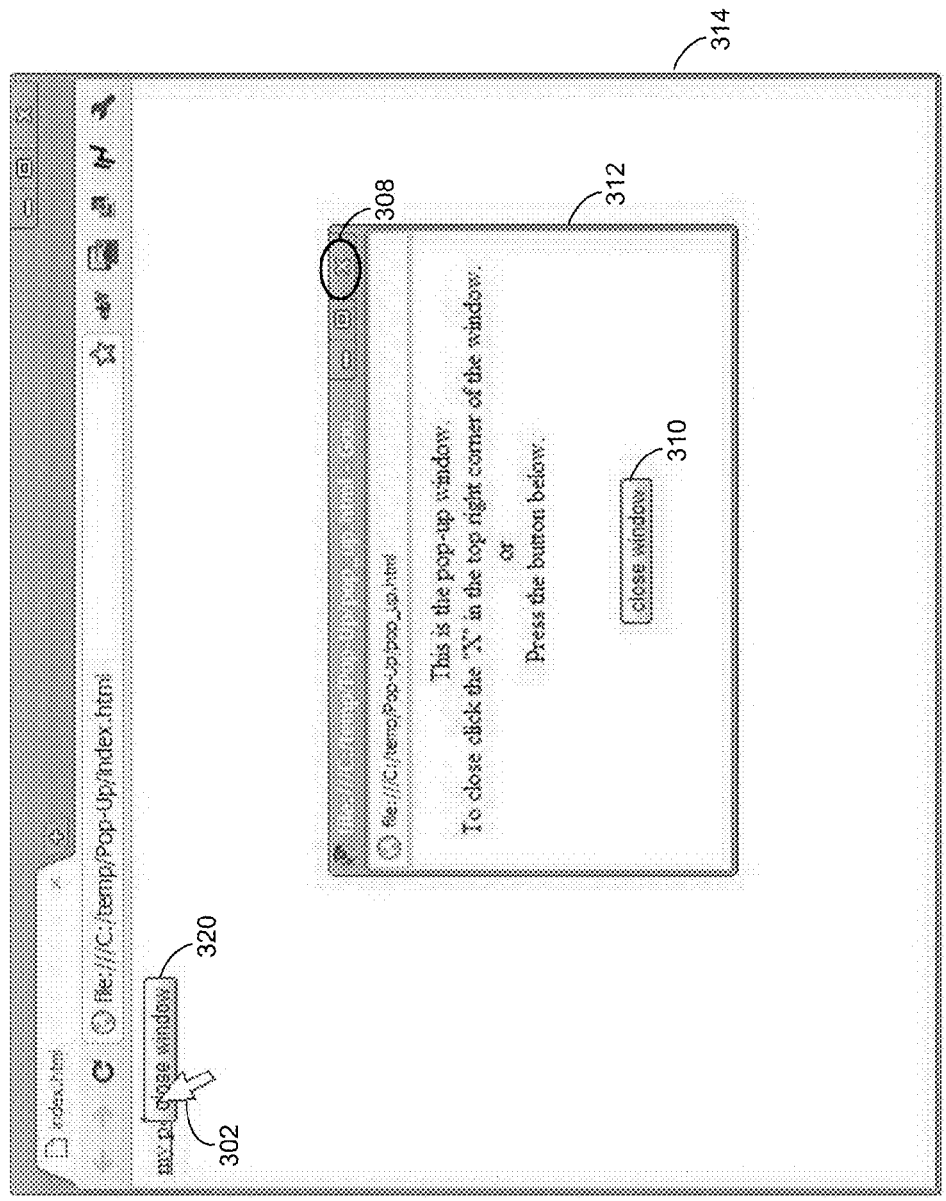
FIG. 3 is a diagrammatic view of a screen image displayed by quick close process of FIG. 1.

Now referring to FIG. 3, a diagrammatic view of a screen image displayed by quick close process 10 is depicted. Main web browser window 314 and pop-up window 312 that provides close window button 310 and X 308 in the upper right corner of window 312 are depicted. Quick close process 10 may have determined 100 pop-up window 312 was launched by main window 314 and quick close process 10 may have determined 102 the location of cursor 302. Quick close process 10 may have generated 104 close button 320 associated with pop-up window 312 and displayed 106 close button 320 at the location of cursor 302. If the user clicks close window button 320, then quick close process 10 may close pop-up window 312 and remove close window button 320. If the user clicks outside of close window button 320, then quick close process 10 may remove close window button 320 without closing pop-up window 312.

Close button 320 may be generated and displayed proximate to a position of cursor 302 at the time that pop-up window 312 is generated. As such the user may, with minimal repositioning of pointer 302 close pop-up window 312. As such, the user may not have to, for example, reposition pointer 302 at close X 308 or close window button 310 (if any are provided in pop-up window 312) of pop-up window 312. Accordingly, quick close process 10 may provide a quick and easy mechanism for a user to close pop-up windows 312 with relatively increased economy of movement (e.g., by eliminating the need to utilized closing features associated with the pop-up).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    determining, by a computing device, a second web browser window was launched by a first web browser window;
    determining, by the computing device, a video content was initiated by the second browser window;
    determining, by the computing device, a location of a cursor using image recognition including scanning a display to identify objects within the display;
    generating, by the computing device, a close button associated with the second web browser window, the close button further associated with a stop function for the video content;
    displaying, by the computing device, the close button at the location of the cursor;
    associating, by the computing device, the close button with at least one additional browser window launched by the first web browser window, wherein the close button uses a different color than the first web browser window;
    modifying, by the computing device, the second web browser window and the at least one additional browser window to match the color of the close button; and
    closing, by the computing device, the second web browser window and the at least one additional browser window in response to receiving a single input from a user via the close button.

2. The computer-implemented method of claim 1, further comprising:
    removing, by the computing device, the close button in response to receiving the single input from the user via the close button.

3. The computer-implemented method of claim 1, wherein the second web browser window is one of a pop-up browser window and a pop-under browser window.

4. The computer-implemented method of claim 1, further comprising:
    generating, by the computing device, a second close button associated with a third web browser window;
    displaying, by the computing device, the second close button; and
    closing, by the computing device, the third web browser window in response to receiving a second input from the user via the second close button.

5. The computer-implemented method of claim 1, further comprising:
    removing, by the computing device, the close button in response to receiving an input from the user clicking outside the close button.

6. The computer-implemented method of claim 1, further comprising:
    removing, by the computing device, the close button in response to the cursor moving outside the close button.

7. A computer program product residing on a non-transitory computer readable medium having a plurality of instructions stored thereon which, when executed by a processor, cause the processor to perform operations comprising:
    determining a second web browser window was launched by a first web browser window;
    determining, by the computing device, a video content was initiated by the second browser window;
    determining a location of a cursor using image recognition including scanning a display to identify objects within the display;
    generating a close button associated with the second web browser window, the close button further associated with a stop function for the video content;
    displaying the close button at the location of the cursor;
    associating the close button with at least one additional browser window launched by the first web browser window, wherein the close button uses a different color than the first web browser window;
    modifying, by the computing device, the second web browser window and the at least one additional browser window to match the color of the close button; and
    closing the second web browser window and the at least one additional browser window in response to receiving a single input from a user via the close button.

8. The computer program product of claim 7, further comprising:
    removing the close button in response to receiving the single input from the user via the close button.

9. The computer program product of claim 7, wherein the second web browser window is one of a pop-up browser window and a pop-under browser window.

10. The computer program product of claim 7, further comprising:
    generating a second close button associated with a third web browser window;
    displaying the second close button; and
    closing the third web browser window in response to receiving a second input from the user via the second close button.

11. The computer program product of claim 7, further comprising:
    removing the close button in response to receiving an input from the user clicking outside the close button.

12. The computer program product of claim 7, further comprising:
    removing the close button in response to the cursor moving outside the close button.

13. A computing system including a processor and memory configured to perform operations comprising:
    determining a second web browser window was launched by a first web browser window;
    determining, by the computing device, a video content was initiated by the second browser window;
    determining a location of a cursor using image recognition including scanning a display to identify objects within the display;
    generating a close button associated with the second web browser window, the close button further associated with a stop function for the video content;
    displaying the close button at the location of the cursor;
    associating the close button with at least one additional browser window launched by the first web browser window, wherein the close button uses a different color than the first web browser window;

modifying, by the computing device, the second web browser window and the at least one additional browser window to match the color of the close button; and closing the second web browser window and the at least one additional browser window in response to receiving a single input from a user via the close button.

14. The computing system of claim 13, further comprising:

removing the close button in response to receiving the single input from the user via the close button.

15. The computing system of claim 13, wherein the second web browser window is one of a pop-up browser window and a pop-under browser window.

16. The computing system of claim 13, further comprising:

generating a second close button associated with a third web browser window;

displaying the second close button; and closing the third web browser window in response to receiving a second input from the user via the second close button.

17. The computing system of claim 13, further comprising:

removing the close button in response to receiving an input from the user clicking outside the close button.

* * * * *